United States Patent [19]

Pratt et al.

[11] Patent Number: 5,032,029

[45] Date of Patent: Jul. 16, 1991

[54] REAR PIVOT MOUNT FOR REAR AXLE

[75] Inventors: William J. Pratt, Lindenhurst; Robert E. King, Wildwood, both of Ill.

[73] Assignee: Komatsu Dresser Company, Libertyville, Ill.

[21] Appl. No.: 498,997

[22] Filed: Mar. 26, 1990

[51] Int. Cl.$^5$ .................. F16C 19/38; B60G 25/00
[52] U.S. Cl. .................................. 384/585; 280/111; 301/124 R; 384/571
[58] Field of Search .............. 384/571, 504, 542, 584, 384/585; 301/124 R, 125; 280/111

[56] References Cited

U.S. PATENT DOCUMENTS

| | | | |
|---|---|---|---|
| 1,293,605 | 2/1919 | Yeakley | 384/571 |
| 3,702,196 | 11/1972 | Krutis | 280/111 |
| 4,082,377 | 4/1978 | Saunders | 301/124 R X |
| 4,613,240 | 9/1986 | Hagelthorn | 384/585 |
| 4,732,497 | 3/1988 | Sawa et al. | 384/585 |

Primary Examiner—Thomas R. Hannon
Attorney, Agent, or Firm—Richards, Medlock & Andrews

[57] ABSTRACT

A rear pivot mount for the rear axle assembly of heavy vehicles is disclosed and includes a housing, a spindle member attached to the rear axle assembly and disposed within the housing, a sleeve member circumferentially disposed about the spindle member and attached to the housing of the rear pivot mount. The sleeve member is spaced radially from the spindle member to form a first and a second cavity therebetween. A bearing member is positioned in each cavity to allow the spindle member to move or pivot with respect to the housing of the rear pivot mount. A retaining member is attached to the spindle member and is in contact with a bearing member to maintain the bearing members in position. A cover member is attached to the housing to provide a sealed cavity around the spindle member, sleeve member and bearing members.

15 Claims, 2 Drawing Sheets 5,032,029

REAR PIVOT MOUNT FOR REAR AXLE

TECHNICAL FIELD OF THE INVENTION

This invention relates generally to heavy vehicles, such as front end loaders, wheel loaders, etc. More particularly, but not by way of limitation, this invention relates to the rear pivot mount for the rear axle assembly of heavy vehicles or the like.

BACKGROUND OF THE INVENTION

It is well known to support the rear axle assembly of heavy vehicles by providing a trunnion pivot support which includes a front pivot mount and a rear pivot mount. The rear pivot mount supports more of the weight of the rear axle assembly than does the front pivot mount and is of a different design than the front pivot mount. The present or prior art design of the rear pivot mount is generally considered the standard in the industry but because of the design, contaminants are able to enter the interior of the rear pivot mount resulting in the failure of the rear pivot mount. The failure is primarily due to the urethane bearing being damaged by the contaminants which are able to enter the interior of the rear pivot mount.

The present invention is intended to provide a solution to various prior art deficiencies which include the inability to keep contaminants from entering the interior of the rear pivot mount as caused by the axial motion of the axle within the rear pivot mount.

SUMMARY OF THE INVENTION

The present invention provides a rear pivot mount for the rear axle assembly of heavy vehicles or the like and comprises a housing, a spindle member attached to the rear axle assembly and disposed within the housing, a sleeve member circumferentially disposed about the spindle member and attached to the housing of the rear pivot mount. The sleeve member is spaced radially from the spindle member to form a first and a second cavity therebetween. A bearing member is positioned in each cavity to allow the spindle member to move or pivot with respect to the housing of the rear pivot mount. A retaining member is attached to the spindle member and is in contact with a bearing member to maintain the bearing members in position. A cover member is attached to the housing to provide a sealed cavity around the spindle member, sleeve member and bearing members. A fitting is provided in the cover for filling the sealed cavity with lubricant.

Among the advantages offered by the present invention is the capability to more successfully keep contaminants from the interior of the rear pivot mount. In addition, the present invention reduces the amount of machining necessary during the manufacture thereof with a resulting reduction in cost.

BRIEF DESCRIPTION OF THE DRAWINGS

Other advantages and features of the invention will become more apparent with reference to the following detailed description of a presently preferred embodiment thereof in connection with the accompanying drawings, where like reference numerals have been applied to like elements, in which.

DETAILED DESCRIPTION

Figure 1:
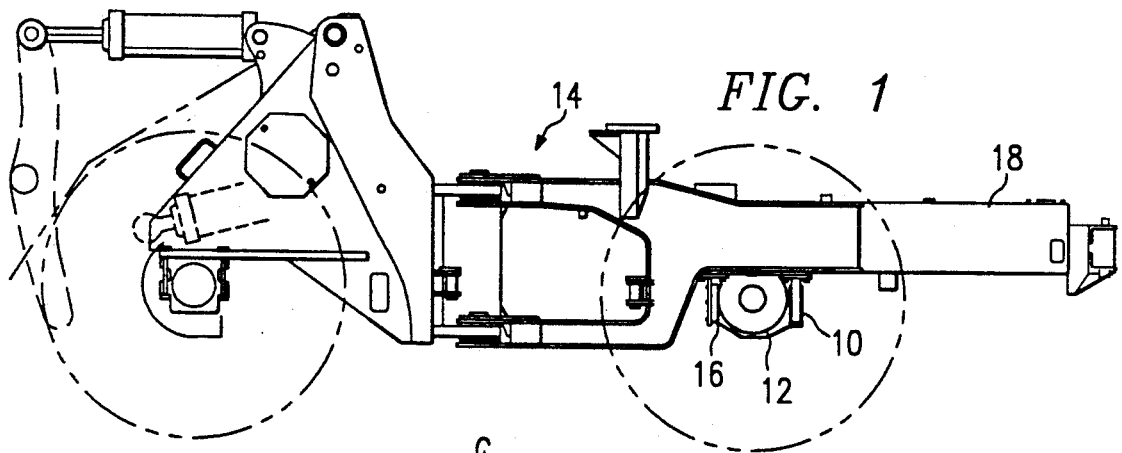
FIG. 1 is a side elevational view, of basically the frame only, of a heavy duty machine showing the front and rear pivot mounts for the rear axle.
Figure 2:
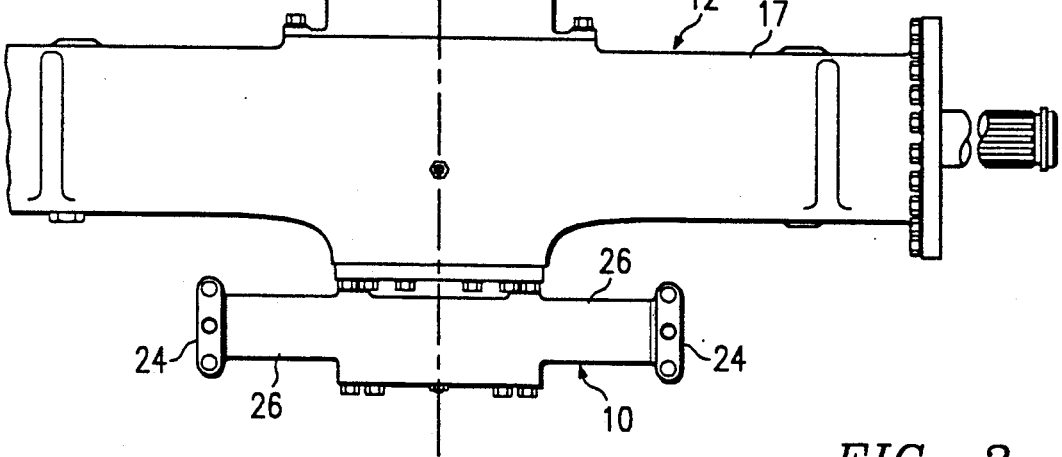
FIG. 2 is top plan view of an exemplary rear axle assembly together with a front and rear pivot mount operatively mounted thereto.

Referring to the drawing and to FIGS. 1 and 2 in particular, shown therein and generally designated by the reference character 10 is a rear pivot mount for the rear axle assembly 12 of an exemplary heavy vehicle 14. Front pivot mount 16 is positioned on the front and opposite side of the rear axle assembly 12 as that of the rear pivot mount 10. It will be appreciated that basically only the frame 18 of the heavy vehicle 14 is shown in FIG. 1 in order to more clearly show the front pivot mount 16, the rear pivot mount 10, and the rear axle assembly 12 in relation to the heavy vehicle 14.

With further reference to FIG. 2, there is shown an exemplary rear axle assembly 12 for a heavy vehicle 14 as supported by a rear pivot mount 10 and front pivot mount 16 which are attached to predetermined portions of the rear axle housing 17. Mounting means 20 on the outer ends of arms or yoke 22 of front pivot mount 16 are used to attach front pivot mount to portions of frame 18 of heavy vehicle 14 while mounting means 24 on the outer ends of arms or yoke 26 of rear pivot mount 10 are used to attach the rear pivot mount 10 to portions of frame 18 thereby providing support between frame 18 and rear axle assembly 12. As the heavy vehicle 14 traverses uneven terrain, the up and/or down movement of the wheels at the outer ends of the rear axle assembly 12 causes the rear axle assembly 12 to pivot (in and out of the paper as shown in FIG. 2) about centerline C/L with respect to the rear pivot mount 10 and the front pivot mount 16. Centerline C/L is at generally a right angle with respect to the long dimension of axle housing 17. The apparatus in the rear pivot mount 10 which allows the rear axle assembly 12 to pivot with respect to the rear pivot mount 10 will be discussed below.

Figure 3:
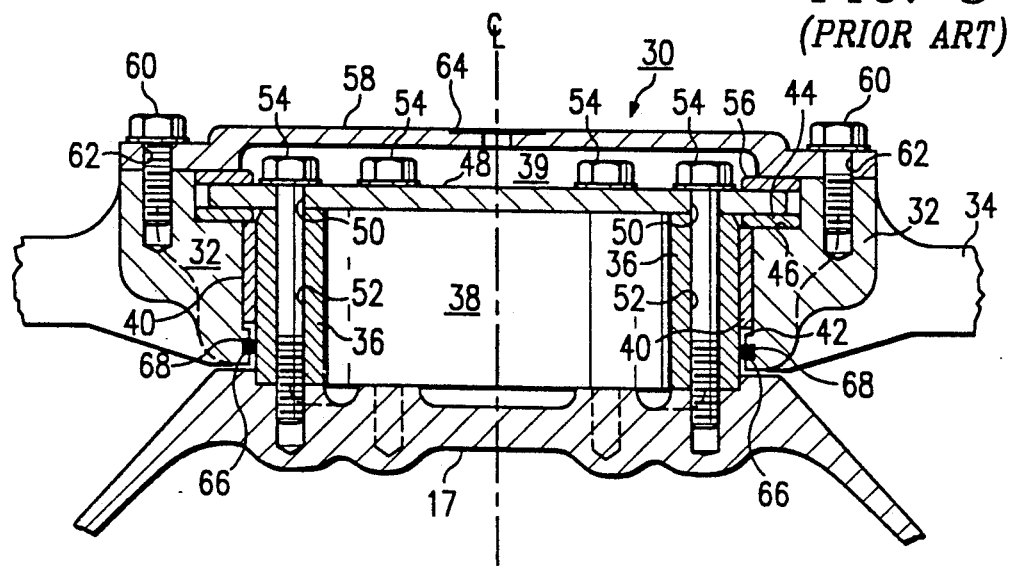
FIG. 3 is a horizontal sectional view taken generally through the center of a rear pivot mount according to the prior art.

With reference to FIG. 3, there is shown a horizontal sectional view of a rear pivot mount as shown in the prior art and is generally designated by the reference character 30. The prior art rear pivot mount 30 comprises a housing 32 including arms or yoke 34 to attach to the frame of the vehicle 14. A cylindrical sleeve member 36 is positioned within cavity 38 formed by housing 32. A polyurethane bushing 40, in the form of a cylindrical sleeve, is positioned between the outer surface of cylindrical sleeve member 36 and housing 32 and abuts against shoulder 42 formed in housing 32. A first bushing 44 is positioned on ledge 46 formed in housing 32. First bushing 44 is in the form of a ring positioned radially outwardly from cylindrical sleeve member 36. Circular pressure plate 48 is positioned against first bushing 44. Apertures 50 are formed in circular pressure plate 48 and are positioned to align with bores 52 formed in the cylindrical sleeve member 36. Fasteners 54, in conjunction with apertures 50 and bores 52, attach cylindrical sleeve member 36 and circular pressure plate 48 to rear axle housing 17. A second bushing 56 is positioned against the circular pressure plate 48 on the side opposite from the side against first bushing 44.

Second bushing 56 is in the form of a ring similar to first bushing 44. A circular cover plate 58 is positioned in contact with second bushing 56 and is attached to housing 32 by fasteners 60 positioned through apertures 62. Circular cover plate 58 includes an aperture 64 therein to accept a fitting for introducing lubricant into cavity 39. An O-ring seal member 66 is positioned in slotted recess 68 formed in housing 32 to form a seal between housing 32 and cylindrical sleeve member 36 and keep contaminants from entering the area containing polyurethane bushing 40 and up into the area containing first bushing 44 and second bushing 56 and also to keep lubricant from escaping from within housing 32.

As the heavy vehicle 14 traverses uneven terrain, the rear axle housing 17 will pivot back and forth around the centerline C/L (in and out of the paper as shown in FIG. 3). It will be appreciated that cylindrical sleeve member 36, circular pressure plate 48 and fasteners 54 will also pivot with rear axle housing 17. The bearing surfaces are between the outer surface of cylindrical sleeve member 36 and the contacting inner surface of polyurethane bushing 40 and between the two outer surfaces of circular pressure plate 48 and the contacting surfaces of first bushing 44 and second bushing 56.

The problem with the prior art rear pivot mount 30 occurs because of the wear which occurs on the contacting and sliding surfaces of first bushing 44 and circular pressure plate 48 and on the contacting and sliding surfaces of second bushing 56 and circular pressure plate 48. Wear may also occur on the contacting surfaces of first bushing 44 and ledge 46 and on contacting surfaces of second bushing 56 and circular cover plate 58. As the contacting surfaces wear, particles of the metal of the contacting surfaces are mixed into the lubricant which then accelerates the wear of the contacting surfaces because of the metal particles. As the contact surfaces wear, the space or gap between the various contacting surfaces increases in width which allows movement, along the centerline C/L, of rear axle housing 17, cylindrical sleeve member 36 and circular pressure plate 48 with respect to housing 32 and circular cover plate 58. As the rear axle housing 17, cylindrical sleeve member 36 and circular pressure plate 48 move along the centerline C/L toward the top of the paper (as shown in FIG. 3) the volume of cavity 39 decreases and the lubricant therein is forced out. Then when the rear axle housing 17, cylindrical sleeve member 36 and circular pressure plate 48 move back along the centerline C/L toward the bottom of the paper (as shown in FIG. 3) contaminates outside housing 32 are brought back inside housing 32 and into the lubricant therein. The contaminated lubricant also causes accelerated wear to the polyurethane bushing 40.

The present invention eliminates the sliding surfaces of the prior art and provides mating surfaces which have a rolling relationship rather than a sliding relationship.

Figure 4:
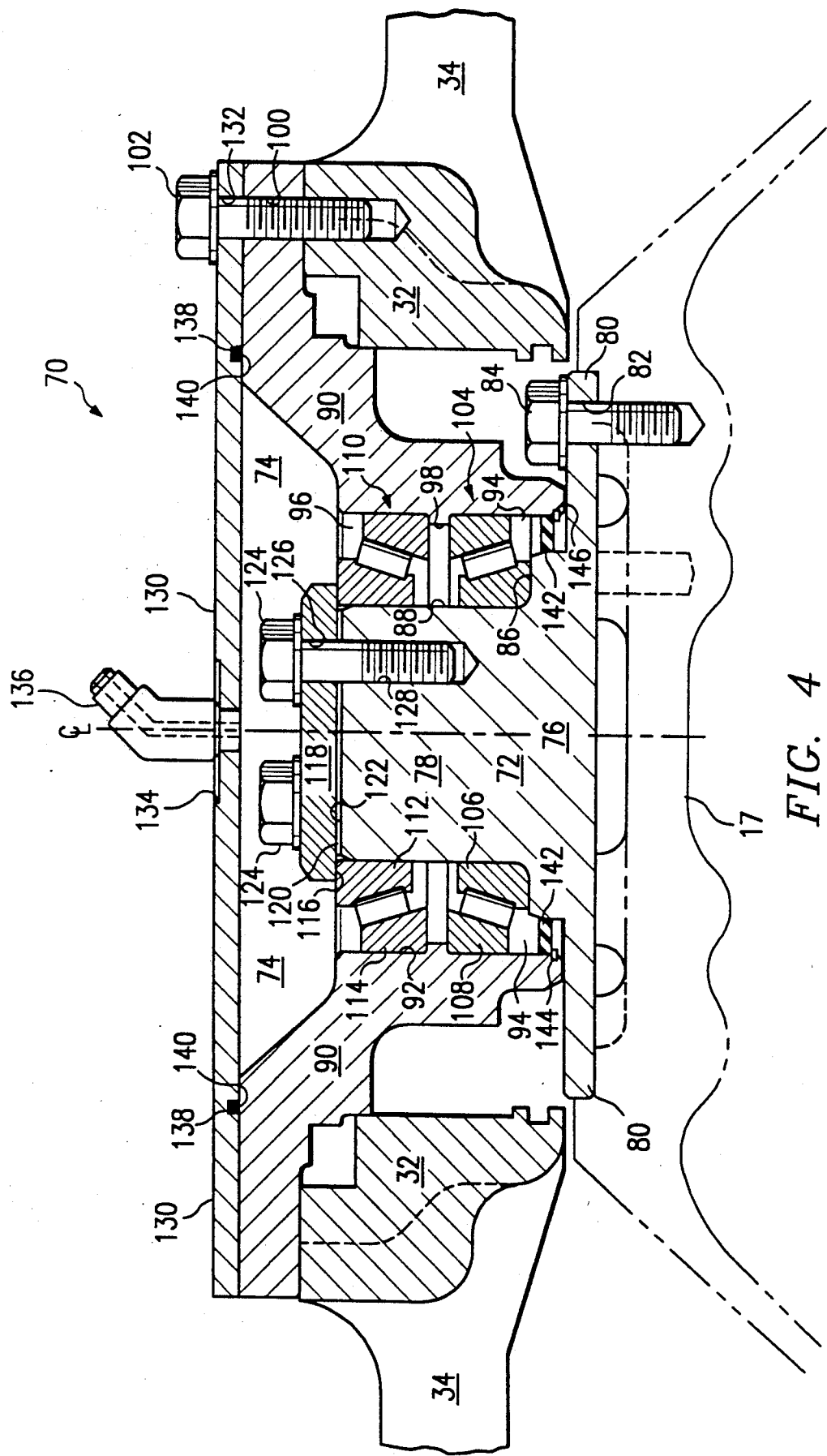
FIG. 4 is a horizontal sectional view taken generally through the center of a rear pivot mount according to the present invention.

With reference to FIG. 4, there is shown a horizontal sectional view of a rear pivot mount constructed in accordance with the present invention and generally designated by the reference character 70. The present inventive rear pivot mount 70 comprises a housing 32 having a centerline C/L and including arms or yoke 34 to attach to the frame of the vehicle 14. A spindle member 72 is positioned within cavity 74 and is aligned to be coaxial with centerline C/L. Spindle member 72 is generally cylindrical in shape having a first end portion 76 and a second end portion 78. First end portion 76 includes an annular flange 80 extending radially outwardly from spindle member 72 and including apertures 82 therein through which fasteners 84 attach the spindle member 72 to rear axle housing 17. Shoulder 86 is formed in the outer surface 88 of spindle member 72 generally between the first end portion 76 and second end portion 78.

Sleeve member 90 is generally cylindrical in shape and is circumferentially disposed about the spindle member 72. The inner surface 92 is spaced from the outer surface 88 of spindle member 72 to form a first annular cavity 94 and a second annular cavity 96 therebetween. Sleeve member 90 includes an annular flange 98 projecting inwardly from the inner surface 92 and positioned generally between first annular cavity 94 and second annular cavity 96. Sleeve member 90 includes apertures 100 therein through which fasteners 102 attach sleeve member 90 to housing 32.

A first bearing member 104 is circumferentially disposed about the spindle member 72 in first annular cavity 94 with the inner race 106 abutting shoulder 86 and outer surface 88 and with the outer race 108 abutting annular flange 98 and inner surface 92. First bearing member 104 is a tapered bearing.

A second bearing member 110 is circumferentially disposed about the spindle member 72 in second annular cavity 96 with the inner race 112 abutting surface 116 of retaining member 118 and outer surface 88 and with the outer race 114 abutting inner surface 92 and annular flange 98. Second bearing member 110 is a tapered bearing.

Retaining member 118 is attached to second end portion 78 by fasteners 124 in conjunction with apertures 126, formed in retaining member 118 and bores 128 formed in spindle member 72. Retaining member 118 extends outwardly past the outer surface 88 of spindle member 72 to engage and abut the inner race 112 of second bearing member 110. Shims 120 are positioned between the face 122 of second end portion 78 of spindle member 72 and retaining member 118 to insure that the correct pressure will be applied to the inner race 112 of second bearing member 110 when fasteners 124 are correctly torqued.

A generally circular cover member 130 is attached to housing 32 by fasteners 102 positioned through apertures 132 formed in cover member 130. Cover member 130 includes aperture 134 formed to accept a fitting 136 for introducing lubricant into cavity 74. At the mating surfaces of cover member 130 and sleeve member 90, a slotted recess 138 is formed circumferentially therearound to accept an O-ring seal member 140 to form a seal between cover member 130 and sleeve member 90 to keep contaminants out and keep the lubricant from leaking from the rear pivot mount 70.

A seal means 142 is circumferentially disposed around the spindle member 72 and is positioned between the first bearing member 104 and annular flange 80 and in the first annular cavity 94. Seal means 142 is held upwardly and out of contact with annular flange 80 by circular ring 144 positioned in slotted recess 146 formed in the inner surface 92 of sleeve member 90. Seal means 142 is in sealing contact with spindle member 72 and the inner surface 92 of sleeve member 90.

As the heavy duty vehicle 14 traverses uneven terrain, the rear axle housing 17 will pivot back and forth around the centerline C/L (in and out of the paper as shown in FIG. 4). It will be appreciated that spindle member 72, retaining member 118, shims 120, inner race 106 of first bearing member 104 and inner race 112 of second bearing member 110 will also pivot with rear axle housing 17. The bearing surfaces being the races and rollers of first and second bearing members. The amount of pivot allowed is approximately 14°.

From the foregoing, it will be appreciated that a rear pivot mount constructed as described in detail hereinbefore, will provide a more reliable pivot mount at reduced cost.

Although the present invention has been described with reference to a presently preferred embodiment, it will be appreciated by those skilled in the art that various modifications, alternatives, variations, etc., may be made without departing from the spirit and scope of the invention as defined in the appended claims.

We claim:

1. A pivot mount for providing support to an elongated rear axle housing of a vehicle, said pivot mount comprising:
    a housing having a centerline generally at right angles with said elongated rear axle housing;
    a spindle member including a first end portion and a second end portion, said spindle member attached to the elongated rear axle housing at said first end portion thereof, said spindle member being coaxial with said centerline of said housing;
    a sleeve member circumferentially disposed about said spindle member and spaced therefrom to form a first annular cavity and a second annular cavity with said spindle, said sleeve member attached to said housing;
    a first bearing member circumferentially disposed about said spindle member in said first cavity and having at least an inner race and an outer race with bearings operatively disposed between said inner and outer races to provide a rolling relationship therewith;
    a second bearing member circumferentially disposed about said spindle member in said second cavity and having at least an inner race and an outer race with bearings operatively disposed between said inner and outer races to provide a rolling relationship therewith; and
    retaining means attached to said second end portion of said spindle member and positioned in retaining contact with the inner race of said second bearing member;
    whereby said spindle member may move in a pivoting motion with respect to said sleeve member.

2. The pivot mount of claim 1 wherein said spindle member further includes an annular flange extending outwardly therefrom at said first end portion and wherein said spindle member is attached to said elongated rear axle housing by said annular flange.

3. The pivot mount of claim 2 further including a seal means circumferentially disposed around said spindle and positioned between said first bearing member and said annular flange and in contact with said spindle and said inner surface of said sleeve member.

4. The pivot mount of claim 1 wherein said spindle member further includes a shoulder extending outwardly from said spindle member between said first end portion and said second end portion thereof.

5. The pivot mount of claim 4 wherein said inner race of said first bearing member abuts said shoulder of said spindle member.

6. The pivot mount of claim 1 wherein said sleeve member further includes an annular flange extending inwardly from the inner surface of said sleeve member and positioned generally between said first annular cavity and said second annular cavity.

7. The pivot mount of claim 6 wherein said outer race of said first bearing member abuts said annular flange of said sleeve member.

8. The pivot mount of claim 6 wherein said inner race of said second bearing member abuts said second end portion of said spindle member and said outer race of said second bearing member abuts said annular flange of said sleeve member.

9. The pivot mount of claim 1 wherein said retaining means is positioned to maintain said first and second bearing members in operative position with respect to said spindle member and said sleeve member.

10. The pivot mount of claim 9 further including shim means positioned between said retaining means and said second end portion of said spindle member.

11. The pivot mount of claim 1 further including a cover member attached to said housing and spaced from said second end portion of said spindle member to form a sealed cavity.

12. The pivot mount of claim 11 further including means in said cover member to fill said sealed cavity with lubricant.

13. The pivot mount of claim 11 further including a resilient annular seal member positioned between said sleeve member and said cover member.

14. The pivot mount of claim 1 wherein said first bearing member and said second bearing member are aligned in a coaxial position.

15. The pivot mount of claim 1 wherein said first bearing member and said second bearing member are tapered bearings.

* * * * *